(12) United States Patent
Azami

(10) Patent No.: US 6,631,232 B1
(45) Date of Patent: Oct. 7, 2003

(54) ADJUSTMENT OF THERMAL DEPENDENCE OF AN OPTICAL FIBER

(75) Inventor: Nawfel Azami, Montreal (CA)

(73) Assignee: ITF Optical Technologies Inc., Montreal (CA)

( * ) Notice: Subject to any disclaimer, the term of this patent is extended or adjusted under 35 U.S.C. 154(b) by 0 days.

(21) Appl. No.: 10/180,991

(22) Filed: Jun. 26, 2002

(30) Foreign Application Priority Data

May 7, 2002 (CA) .............................................. 2385178

(51) Int. Cl.[7] ................................................ G02B 6/16
(52) U.S. Cl. ........................................ 385/123; 385/141
(58) Field of Search ................................ 385/123, 124, 385/141; 65/385

(56) References Cited

U.S. PATENT DOCUMENTS

| | | | |
|---|---|---|---|
| 5,235,659 A | 8/1993 | Atkins et al. ............... 385/124 |
| 5,478,371 A * | 12/1995 | Lemaire et al. ............... 65/384 |
| 5,930,420 A | 7/1999 | Atkins et al. ................. 385/37 |
| 6,075,596 A * | 6/2000 | Pan et al. .................... 356/477 |
| 6,201,918 B1 * | 3/2001 | Berkey et al. ............. 385/128 |
| 6,221,566 B1 * | 4/2001 | Kohnke et al. ............ 385/123 |
| 6,240,224 B1 * | 5/2001 | Reekie et al. ................ 385/37 |
| 6,334,018 B1 * | 12/2001 | Fokine ....................... 385/124 |
| 6,400,870 B1 * | 6/2002 | Hill et al. ..................... 385/39 |

* cited by examiner

Primary Examiner—Michael P. Stafira
Assistant Examiner—Juan Valentin
(74) Attorney, Agent, or Firm—George J. Primak

(57) ABSTRACT

A method of adjusting thermal dependence of an optical fiber involves hydrogenating the fiber to render it photosensitive, and then exposing it to UV radiation for such time period as to achieve the desired adjustment in the thermal dependence. In an all-fiber Mach-Zehnder interferometer, the method involves using a photosensitive fiber as one of the arms of the interferometer and exposing this photosensitive fiber to UV radiation so as to adjust the thermal dependence of the interferometer. The resulting interferometer is also part of the invention.

18 Claims, 3 Drawing Sheets

ADJUSTMENT OF THERMAL DEPENDENCE OF AN OPTICAL FIBER

FIELD OF THE INVENTION

This invention relates to a method of adjusting thermal dependence of an optical fiber. In addition, the invention relates to the adjustment of thermal dependence in a Mach-Zehnder interferometer (MZI) having two different fibers as its arms.

BACKGROUND OF THE INVENTION

Optical fibers are used in various applications, such as Mach-Zehnder interferometers, signal combiners, optical filters and the like. For most of these applications, a control of the thermal dependence is required.

For example, an adjustment of the thermal dependence may be required when the fibers used to form the two arms of the MZI have different dopants to achieve the required optical path-length difference. Such dissimilar fibers usually present a different thermal dependence of the effective index of refraction in each of the two arms, which difference should be reduced as much as possible to achieve proper operation of the MZI.

OBJECTS AND SUMMARY OF THE INVENTION

It is an object of the present invention to provide a simple and effective method for adjustment of the thermal dependence of an optical fiber.

Another object is to provide adjustment of the thermal dependence of an all-fiber Mach-Zehnder interferometer having two different fibers as its arms.

A further object is to effect the adjustment of the thermal dependence in the MZI essentially without affecting the optical phase shift or spectral response of the interferometer.

Other objects and advantages will be apparent from the following description of the invention.

The present invention comprises subjecting an optical fiber, such as one of the optical fibers of a Mach-Zehnder interferometer having two different fibers as arms, to hydrogenation to make it photosensitive, followed by exposure of the photosensitive fiber to ultraviolet radiation (UV) for a predetermined period of time so as to adjust the thermal dependence of the fiber to a desired degree. This results in a decrease of the thermal dependence of the effective index of the fiber. In essence, therefore, the present invention provides a method of adjusting the thermal dependence of a photosensitive optical fiber by exposing it to UV radiation for a predetermined period of time. In the MZI, this can be achieved without affecting the optical phase shift between the arms of the MZI. Further, the decrease is greater as the time of exposure to the UV is greater, thus permitting a desired adjustment of the thermal dependence.

It is already known from U.S. Pat. No. 5,235,659 to produce large normalized refractive index changes in optical waveguides by hydrogenation of the fiber at a temperature of at most 250° C. and then irradiating the so exposed fiber with UV radiation.

U.S. Pat. No. 5,478,371 discloses an improvement of the above method by first subjecting the fiber to hydrogenation, followed by heating and simultaneous UV radiation. This is stated to produce a substantive and long lived increase in the refractive index of the irradiated region.

U.S. Pat. No. 5,930,420 discloses a further improvement which provides for heating the hydrogenated glass to a temperature in excess of 500° C., then permitting the glass to rapidly cool below 100° C., followed by exposure to UV radiation. This is stated to increase the index of refraction of the so treated region.

Moreover, from U.S. Pat. No. 6,075,596 it is already known to provide one of the arms of a Mach-Zehnder interferometer with a length of photosensitive fiber and then exposing it to deep UV light. This is done for adjusting the optical path-length so as to enhance the bandwidth of the fiber optic circulator which is the object of that patent.

Finally, U.S. Pat. No. 6,221,566 provides for a method of enhancing the photosensitivity of an optical waveguide by loading it with $H_2$ or $D_2$ to form an associated base line refractive index, then exposing it to UV radiation to induce a change in the base line refractive index and finally annealing the waveguide to diffuse the gas from the loaded optical waveguide and to stabilize the change in the refractive index.

All this prior art deals with adjustment or control of the refractive index in an optical fiber or waveguide, and none of it provides any indication that hydrogenation of an optical fiber to render it photosensitive, followed by exposure to UV could control the thermal dependence of the fiber, or of a device, such as an MZI in which the fiber is used, without essentially affecting the optical path-length difference between the arms of the MZI.

The invention will be more fully disclosed in the following description taken together with the accompanying drawings.

DETAILED DESCRIPTION OF THE INVENTION

Figure 1:
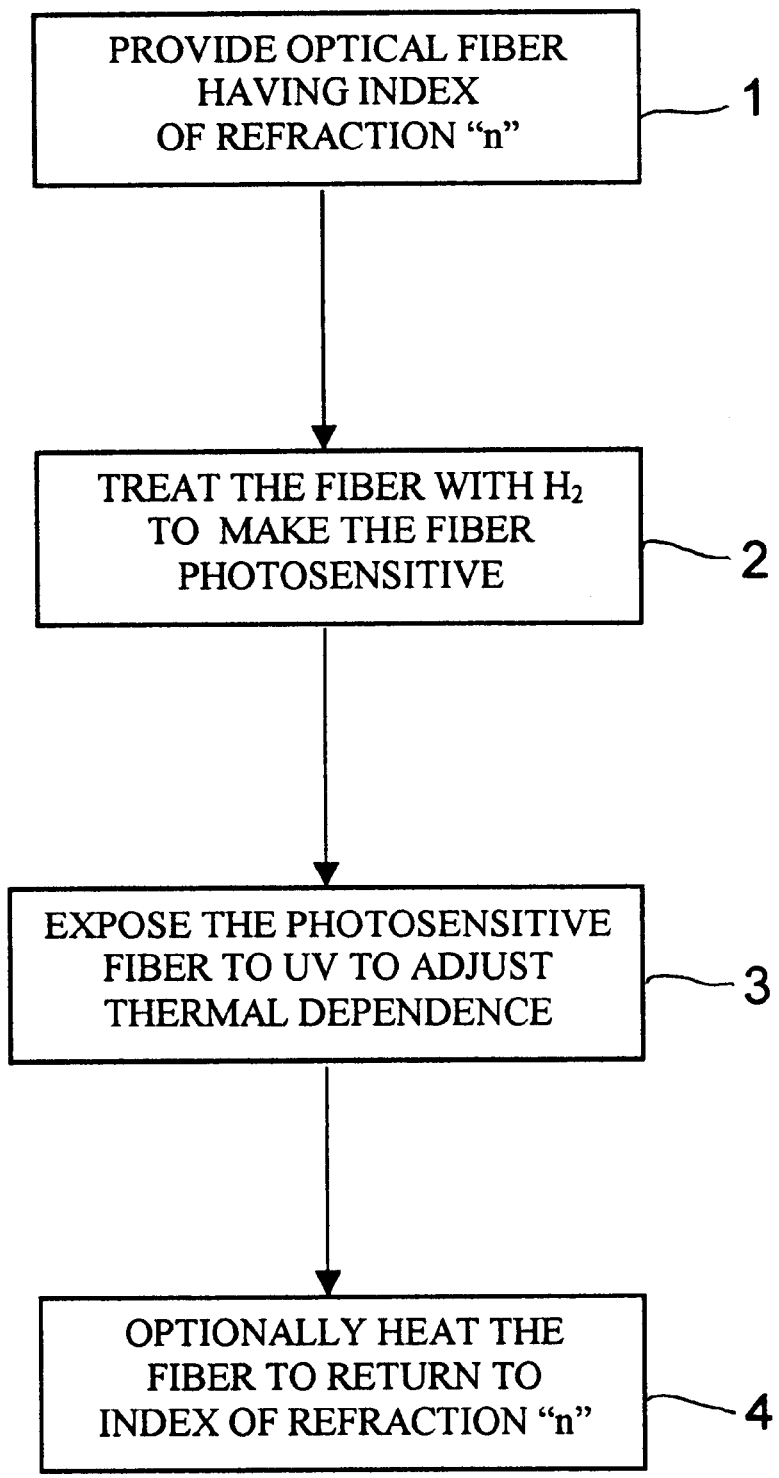
FIG. 1 is a block diagram showing the steps of the method used in accordance with the present invention to adjust the thermal dependence of an optical fiber.

A preferred embodiment of the method of the present invention is illustrated in FIG. 1. It comprises providing in step 1 an optical fiber having an index of refraction "n". The thermal dependence of such fiber can be expressed as dn/dT which is a thermo-optic coefficient representing the change of the index of refraction with the change in temperature. Then, in step 2, this fiber is treated with $H_2$ to make it photosensitive. This may be done, for example, by placing the fiber in a pressure chamber, filling the chamber with hydrogen at a suitable pressure, e.g. 1800 psi (12,420 kP), and leaving the fiber there for a period of time suitable to achieve photosensitivity, e.g. 12 hours. It should be noted that this step 2, as such, is generally known in the art and has been described in several patents already mentioned above. This step produces an increase in the index of refraction of the fiber which becomes n+dn and the thermal dependence becomes dn/dT+d(dn/dT).

Thereafter, the photosensitive fiber is subjected, in step 3, to UV radiation, for example, at a wavelength of between 190 and 250 nm. In this example, the fiber was exposed to UV at a wavelength of 193 nm. Such treatments of optical fibers with UV radiation are also know in the art and have been described in the above mentioned patents. As mentioned for example in U.S. Pat. No. 5,235,659, such exposure can lead to a further increase in the refractive index of the fiber which can then be expressed as n+dn' where n' is an increased index of refraction over n. At this stage, the thermal dependence can be expressed as dn/dT+d(dn'/dT).

It has been surprisingly found in accordance with the present invention that at this stage 3, one can control or adjust the thermal dependence of the optical fiber by controlling the time of exposure of the photosensitive fiber to UV radiation. Moreover, it has been surprisingly discovered that the change in the thermal dependence provided by this method remains constant even if the index of refraction is further changed, for instance, by exposing the fiber to heat in step 4 of FIG. 1. Thus, by heating the fiber to a temperature greater than 800° C., for example 1400° C., one can bring down the index of refraction of the fiber back to the value of n, without affecting the adjusted thermal dependence which remains at dn/dT+d(dn'/dT).

A Corning SMF-28 optical fiber, which is a standard fiber used in industry, was treated as described in steps 1, 2 and 3 above, namely by subjecting it to hydrogenation and UV radiation and the effect of UV exposure on thermal dependence was as follows.

| Time of UV Exposure in minutes | Thermal Dependence pm/° C. |
| --- | --- |
| 0 | −16.0 |
| 5 | −16.0 |
| 10 | −15.1 |
| 15 | −11.9 |
| 20 | −7.1 |
| 25 | −4.0 |
| 30 | +20.0 |

Figure 2:
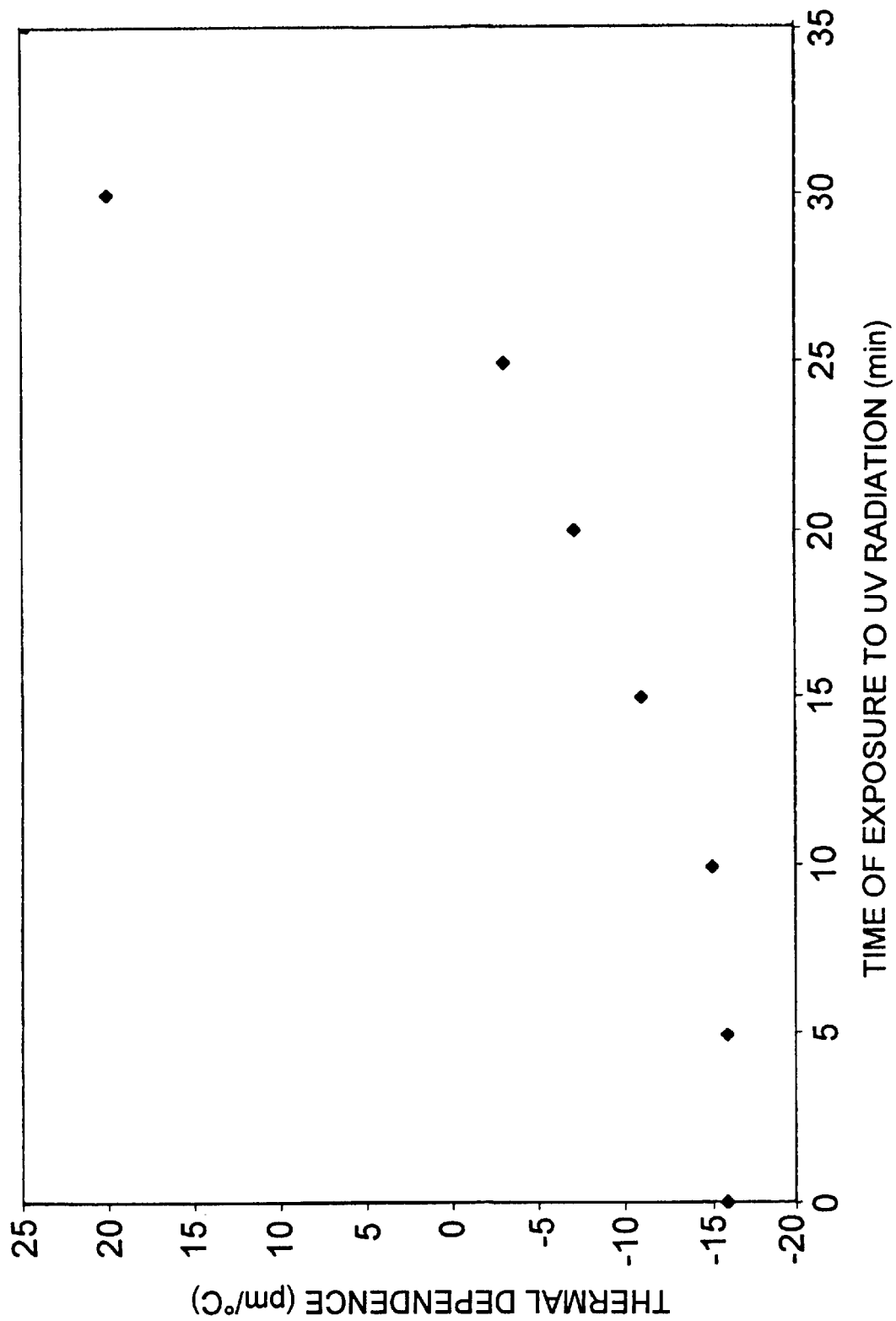
FIG. 2 is a graph showing the variation of thermal dependence of a photosensitive optical fiber as a function of the time of exposure to UV.

These results, where the thermal dependence is expressed in picometers per degree C. over a time of exposure from 0 to 35 minutes, are plotted in FIG. 2. Thus, when the fiber has been treated with $H_2$ in step 2 of FIG. 1, it's thermal dependence is −16 pm/° C. This thermal dependence essentially does not change during the first 5 minutes of exposure to UV radiation which might have led to believe that it would not change at all. However, surprisingly, the change in thermal dependence then starts to occur gradually and continues more steeply as shown by the graph of FIG. 2. Between 10 and 25 minutes of exposure, the change in thermal dependence of the fiber is essentially linear. Thus, an adjustment of the thermal dependence of the fiber may readily be made by maintaining exposure to UV radiation for a predetermined period of time generally between 5 and 30 minutes, and preferably between 10 and 25 min.

A preferred application of this invention can be found in the adjustment of thermal dependence m a Mach-Zehnder interferometer which has two fused fiber couplers interconnected by two optical fibers, one of which is a special fiber or has an insert of a special fiber that produces an optical phase shift (optical path length difference) required to achieve the Mach-Zehnder effect. Control of thermal dependence in such interferometers is especially important.

Figure 3:
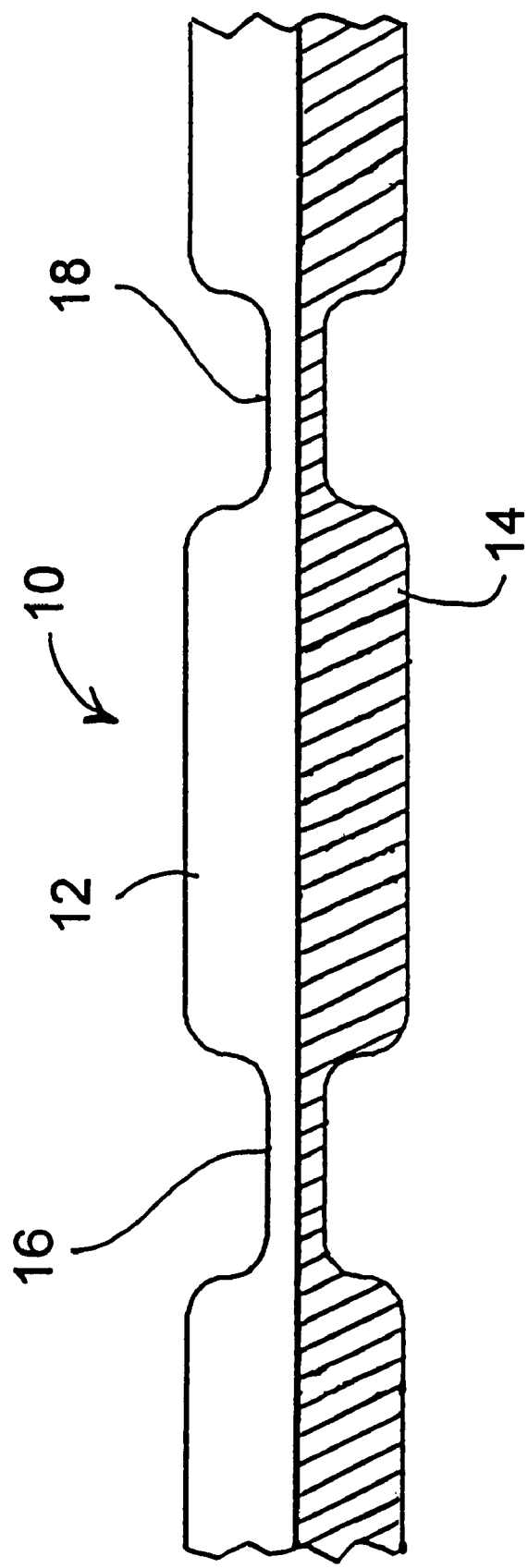
FIG. 3 is a schematic representation of a Mach-Zehnder interferometer having two arms of equal length between two couplers, in which one of the arms is made of a different fiber than the other and is treated in accordance with the method of FIG. 1.

Such Mach-Zehnder interferometer 10 is illustrated in FIG. 3. It has two arms 12 and 14 of equal length between couplers 16 and 18 of the interferometer. Arms 12 and 14 are made of different fibers to achieve a desired optical path-length difference or phase shift between them. For example, arm 12, in this particular embodiment, is made of Corning SMF-28 fiber which is a standard optical fiber and arm 14 is made of a special fiber Redfern GF2 (Ge—B/$SiO_2$) which is provided with the Ge—B dopants having, for instance, 30% $GeO_2$ and 6.5% $B_2O_3$. In accordance with the present invention, the SMF-28 fiber of arm 12 is first hydrogenated to make it photosensitive and then is subjected to UV radiation for a time suitable to adjust the thermal dependence of the MZI as shown in the graph of FIG. 2. The spacing between two transmission peaks of the Mach-Zehnder interferometer in this case was of 19 nm to 20 nm and remained substantially constant irrespective of the degree of exposure to UV radiation which thus has essentially no influence on the spectral response of the interferometer. Also, during the formation of the couplers 16 and 18, the heat from the torch tends to destroy the effect of increase in refractive index without, however, affecting the adjusted thermal dependence.

It should be noted that in lieu of having two entirely different fibers as arms 12 and 14, one could have similar fibers, but one of them having an insert of a special fiber to achieve the desired optical path-length difference. In such case, it is the fiber without the insert that is subjected to hydrogenation and UV radiation. Also, as special fibers, various doped fibers can be used, such as those doped with $GeO_2$, $P_2O_5$, $B_2O_3$, F and a combination thereof.

The invention is not limited to the specific embodiments described above, but obvious modifications may be made by those skilled in the art without departing from the invention and the scope of the following claims.

What is claimed is:

1. Method of adjusting thermal dependence of an hydrogenated optical fiber comprising subjecting the fiber to hydrogenation to make it photosensitive, then exposing the photosensitive fiber to UV radiation for a predetermined period of time so as to decrease the thermal dependence of the fiber to a desired level.

2. Method according to claim 1, in which the photosensitive fiber is exposed to UV radiation at a wavelength of between 190 and 250 nm for a period of time between 5 and 30 minutes.

3. Method according to claim 1, in which the photosensitive fiber is exposed to UV radiation at a wavelength of between 190 and 250 mn for a period of time between 10 and 25 minutes.

4. Method according to claim 1, in which, after being exposed to UV radiation, the fiber is heated to a temperature above 800° C. to lower its index of refraction without affecting the thermal dependence at the adjusted level.

5. Method of adjusting thermal dependence of a photosensitive optical fiber which comprises exposing said hydrogenated photosensitive fiber to UV radiation for a predetermined period of time.

6. Method according to claim 5, in which the photosensitive fiber is exposed to UV radiation at a wavelength of between 190 and 250 nm for a period of time between 5 and 30 minutes.

7. Method according to claim 5, in which the photosensitive fiber is exposed to UV radiation at a wavelength of between 190 and 250 mn for a period of time between 10 and 25 minutes.

8. Method according to claim 5, in which, after being exposed to UV radiation, the fiber is heated to a temperature above 800° C. to lower its index of refraction without affecting the thermal dependence at the adjusted level.

9. Method of adjusting thermal dependence in an all-fiber Mach-Zehnder interferometer having two arms made-up of different fibers adapted to achieve a desired optical phase shift, comprising subjecting one of the fibers to hydrogenation to render it photosensitive, followed by exposure to UV radiation for a predetermined period of time so as to adjust the thermal dependence of the interferometer to a desired value, essentially without affecting the optical phase shift between the arms.

10. Method according to claim 9, in which the fiber subjected to hydrogenation is hydrogenated prior to its insertion as an arm of the interferometer.

11. Method according to claim 9, in which the fibers used for the two arms of the interferometer are of same length, but of different index of refraction adapted to achieve the desired optical phase shift.

12. Method according to claim 11, in which one of the fibers is a standard optical fiber whereas at least a portion of the second fiber is a special fiber provided with dopants.

13. Method according to claim 12, in which the dopants are selected from $GeO_2$, $P_2O_5$, $B_2O_3$, F, and a combination thereof.

14. An all-fiber Mach-Zehnder interferometer having two arms made-up of different fibers adapted to achieve a desired optical phase shift, one of said fibers being photosensitive and exposed to UV radiation to adjust thermal dependence of the interferometer.

15. An all-fiber Mach-Zehnder interferometer according to claim 14, in which the two fibers used as the arms of the interferometer are of the same length, but of different index of refraction providing the desired optical phase shift between the two arms of the interferometer.

16. An all-fiber Mach-Zehnder interferometer according to claim 15, in which one of the two fibers is a standard optical fiber, whereas at least a portion of the second fiber is a special fiber provided with dopants.

17. An all-fiber Mach-Zehnder interferometer according to claim 16, in which the dopants are selected from $GeO_2$, $P_2O_5$, $B_2O_3$, F or a combination thereof.

18. An all-fiber Mach-Zehnder interferometer according to claim 16, in which the photosensitive fiber is the standard optical fiber.

* * * * *